United States Patent [19]
Tsuda et al.

[11] Patent Number: 6,008,844
[45] Date of Patent: *Dec. 28, 1999

[54] DISPLAY DEVICE HAVING INDEX MOVEMENT DIRECTION IN CORRESPONDENCE WITH ASPECT RATIO

[75] Inventors: Yuji Tsuda, Kanagawa-ken; Kenji Kyuma, Saitama-ken, both of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/623,975

[22] Filed: Mar. 29, 1996

[30] Foreign Application Priority Data

Apr. 7, 1995 [JP] Japan ................................. 7-082644

[51] Int. Cl.$^6$ .................................................. H04N 5/222
[52] U.S. Cl. ............................................ 348/334; 348/333
[58] Field of Search .................................... 348/207, 211, 348/212, 213, 218, 333, 334, 345, 349, 350, 362, 364; 396/89, 70, 147, 148, 296, 373, 374; 345/348, 342, 343, 157, 127, 130; H04N 5/222

[56] References Cited

U.S. PATENT DOCUMENTS

| | | | |
|---|---|---|---|
| 5,121,152 | 6/1992 | Wagner | 348/402 |
| 5,196,929 | 3/1993 | Miyasaka | 348/169 |
| 5,343,303 | 8/1994 | Delmas | 348/346 |
| 5,568,183 | 10/1996 | Cortjens et al. | 348/211 |

*Primary Examiner*—Tuan Ho
*Attorney, Agent, or Firm*—Robin, Blecker & Daley

[57] ABSTRACT

A display device is arranged to cause a display part to display, on an image plane, an index for selecting a part of the image plane which is arranged to display an image thereon, to cause a moving part to move the index in a predetermined direction on the image plane, and to cause a control part to control the direction of movement of the index in such a manner that the direction of movement is changed according to an aspect ratio of the image plane of the display part, whereby a high-quality display can be provided irrespective of the aspect ratio.

18 Claims, 7 Drawing Sheets

F I G. 5(a) 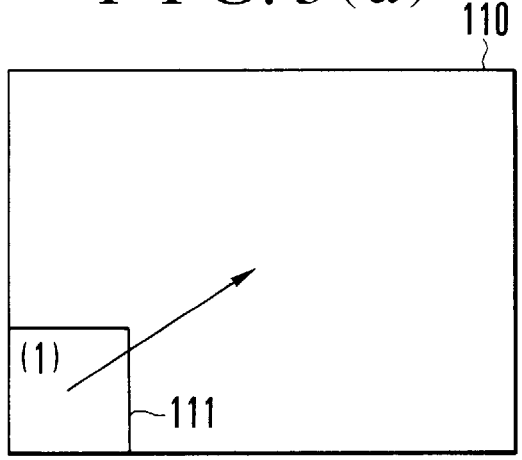 F I G. 5(b)
F I G. 5(c) 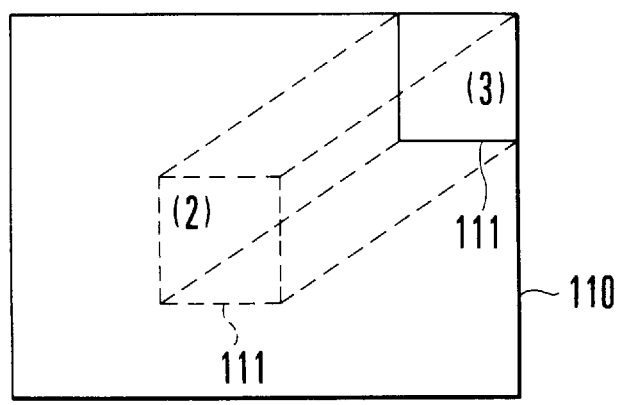
WHERE ASPECT RATIO IS 4 : 3
F I G. 7
WHERE ASPECT RATIO IS 16 : 9
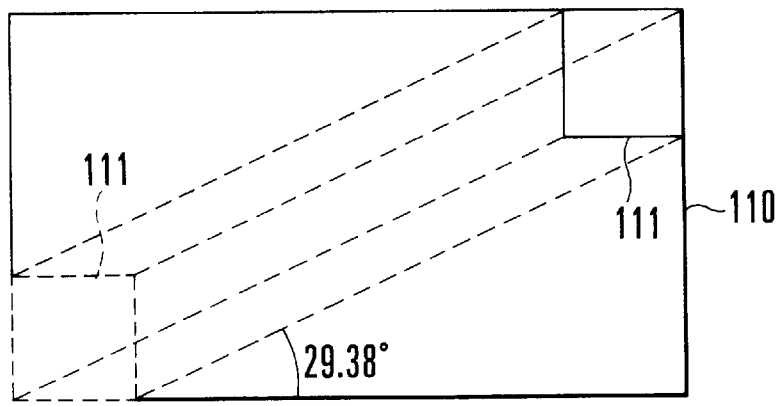

DISPLAY DEVICE HAVING INDEX MOVEMENT DIRECTION IN CORRESPONDENCE WITH ASPECT RATIO

BACKGROUND OF THE INVENTION

1. Field of the Invention

This invention relates to a display device for use in a viewfinder of a camera-integrated type VTR or the like.

2. Description of the Related Art

FIG. 1 is a block diagram showing the arrangement of the conventional camera-integrated type VTR (video tape recorder). Referring to FIG. 1, a lens 1 is arranged to form an image of an object of shooting. An iris 2 is composed of iris blades arranged to adjust the quantity of incident light. An image sensor 3 which is a CCD or the like is arranged to photo-electrically convert into a video signal an image which is formed by the lens 1 and the quantity of light of which is adjusted by the iris 2. An automatic gain control circuit (hereinafter referred to as an AGC circuit) 4 is arranged to electrically amplify the video signal outputted from the image sensor 3. A video signal processing circuit 5 is arranged to convert the video signal into a standardized video signal by carrying out a predetermined signal processing action on the video signal. A video tape recorder (abbreviated to VTR) part 6 is arranged to record the video signal on a tape. A moving direction selecting circuit 7 is arranged to move the display position of an index or area which is provided for selection of a part of the video signal (hereinafter referred to as a "selection frame") in the direction intended by the operator of the VTR in response to an input from such input means as a joy stick, a track ball, a mouse, a touch panel or the like. A position designating circuit 8 is arranged to designate a display position of the above-stated selection frame with respect to the moving direction selected by the moving direction selecting circuit 7. The position designating circuit 8 is composed of a microcomputer disposed within the camera part of the VTR. A display signal forming circuit 9 is arranged to form a selection frame display signal for displaying the selection frame in a position designated by the position designating circuit 8. A signal adding circuit 10 is arranged to add the selection frame display signal to the video signal to obtain a sum signal. An electric viewfinder (abbreviated to EVF) 11 is arranged as a monitor device for allowing the operator to monitor the sum signal obtained by the signal adding circuit.

FIG. 2 shows a selection frame 111 which is displayed on an image plane of the EVF 11. The selection frame 111 is provided for selecting an area to be used for distance measurement or light measurement on the image plane 110 of the EVF 11 in carrying out automatic focusing (AF) or an automatic exposure (AE). In this example, the selection frame 111 is arranged to permit selection, by the moving direction selecting circuit 7, of any of eight directions which differ from each other by 45 degrees as shown in FIG. 2.

The conventional camera-integrated type VTR operates as follows. Referring to FIG. 1, an optical image obtained by the image forming lens 1 is photo-electrically converted into a video signal by the image sensor 3 through the iris 2. After photo-electric conversion, the video signal is amplified by the AGC circuit 4. The amplified video signal is sent to the video signal processing circuit 5. At the video signal processing circuit 5, the video signal is subjected to various processes such as gamma correction, color separation and color-difference matrixing processes. After these processes, synchronizing signals are added to the video signal to convert the video signal into a standard TV signal. The TV signal is supplied to the VTR part 6, where the TV signal is recorded on a tape.

One of the eight moving directions of the selection frame 111 is selected by the moving direction selecting circuit 7. The position designating circuit 8 determines the display position of the selection frame 111 and the selection frame 111 is moved accordingly. At the display signal forming circuit 9, a selection frame display signal for displaying the selection frame 111 in the display position determined by the position designating circuit 8 is formed and applied to the signal adding circuit 10. At the signal adding circuit 10, the selection frame display signal from the display signal forming circuit 9 is added to the video signal from the video signal processing circuit 5 to obtain a sum signal. The sum signal thus obtained is supplied to the EVF 11 to be displayed there. The EVF 11 then permits the operator to monitor the selection frame 111 along with a video image.

Referring to FIGS. 3(a) to 3(f), in a case where a moving direction is selected by the moving direction selecting circuit 7, for example, for an "obliquely upward direction to the right" to move the selection frame 111 from a left lower end to a right upper end on the image plane 110 of the EVF 11, the VTR operates as follows. It is to be noted that the aspect ratio of the image plane 110 of the EVF 11 shown in FIGS. 3(a) to 3(f) is 4:3.

Assume that the selection frame 111 is placed in a position (1) as shown in FIG. 3(a) before the commencement of moving the selection frame 111. Further, assume that the moving direction selecting circuit 7 is caused to select a "45° obliquely upward direction to the right" as a moving direction and that the selection frame 111 is moved in that moving direction. FIG. 3(b) shows a locus of movement of the selection frame 111 from the position (1) to another position (2). In this instance, the selection frame 111 is thus moved in the "45° obliquely upward direction to the right", which is a moving direction selected by the moving direction selecting circuit 7. FIG. 3(c) shows a locus of movement of the selection frame 111 from the position (2) to a position (3). As the selection frame 111 is caused to continue its movement in the "45° obliquely upward direction to the right" in this manner, the selection frame 111 comes to a stop when the upper side of the selection frame 111 impinges on the upper side of the image plane 110. If it is desired to further move the selection frame 111 from this position up to the right upper end of the image plane 110, the moving direction selecting circuit 7 is caused to select a "horizontal direction to the right" as a moving direction. FIG. 3(d) shows a locus of movement of the selection frame 111 from the position (3) to a position (4). FIG. 3(e) shows a locus of further movement of the selection frame 111 from the position (4) to a position (5). As the selection frame 111 is allowed to continue its movement in the "horizontal direction to the right" in this manner, the right side of the selection frame 111 comes to impinge on the right side of the image plane 110. The selection frame 111 then comes to a stop at the right upper end (5), as shown in FIG. 3(f). In this position, the upper side of the selection frame 111 coincides with the upper side of the image plane 110 and the right side of the selection frame 111 coincides with the right side of the image plane 110. It is, therefore, impossible to move the selection frame 111 any further even if an instruction is given for moving the selection frame 111 in the "horizontal direction to the right". The selection frame 111 thus can be moved up to the right upper end part of the image plane 110.

In the display device of the camera-integrated type VTR described above, a movement of the selection frame 111 in the moving direction selected by the moving direction selecting circuit 7, however, has presented a problem, which is as follows. For example, in moving the selection frame 111 from the left lower end to the right upper end of the image plane 110 having the aspect ratio of 4:3 in the TV viewfinder, as shown in FIGS. 3(a) to 3(f), a locus of movement of the selection frame 111 is such that the selection frame 111 first comes to the upper side of the image plane 110 and, after that, reaches the right upper end by moving in the horizontal direction to the right. Such a locus of movement of the selection frame 111 is not only disadvantageous in terms of operability for the operator but also degrades the quality of the display device as the movement appears to be unnatural.

SUMMARY OF THE INVENTION

It is an object of this invention to provide a display device which is capable of making a high quality display.

It is another object of this invention to provide a display method which is capable of making a high quality display.

It is a further object of this invention to provide a display device which is capable of making a natural display irrespective of its aspect ratio.

It is a still further object of this invention to provide a display method which is capable of making a natural display irrespective of its aspect ratio.

To attain these objects, a display device arranged as an embodiment of this invention comprises display means for displaying an image on an image plane and for displaying an index for selecting a part of the image plane, moving means for moving the index in a predetermined direction on the image plane, and control means for providing a control to change the direction of movement of the index according to an aspect ratio of the image plane of the display means.

A display device arranged as another embodiment of this invention comprises display means for displaying, on an image plane arranged to display an image, an index for selecting a part of the image plane, moving means for moving the index in a predetermined direction on the image plane, and control means for providing a control to change the direction of movement of the index according to an aspect ratio of the image.

A display device arranged as a further embodiment of this invention comprises display means for displaying, on an image plane arranged to display an image, an area for selecting a part of the image plane, moving means for moving the area in a predetermined direction on the image plane, and control means for providing a control to cause the moving means to change the direction of movement of the area according to an aspect ratio of the image plane of the display means.

A display device arranged as a still further embodiment of this invention comprises display means for displaying, on an image plane arranged to display an image, an area for selecting a part of the image plane, moving means for moving the area in a predetermined direction on the image plane, and control means for providing a control to cause the moving means to change the direction of movement of the area according to an aspect ratio of the image.

In accordance with the arrangement described above, it is possible to provide a display device which makes a high quality display and a display device which makes a natural display irrespective of the aspect ratio of the image plane or the aspect ratio of the image.

Further, in accordance with one embodiment of this invention, when an index for selecting a part of an image plane arranged to display an image thereon is displayed on the image plane and the index is made to move in a predetermined direction on the image plane, the direction of movement of the index is changed according to an aspect ratio of the image plane.

Furthermore, in accordance with the other embodiment of this invention, when an index for selecting a part of an image plane arranged to display an image thereon is displayed on the image plane and the index is made to move in a predetermined direction on the image plane, the direction of movement of the index is changed according to an aspect ratio of the image.

Further, in accordance with the further embodiment of this invention, when an area for selecting a part of an image plane arranged to display an image thereon is displayed on the image plane and the area is made to move in a predetermined direction on the image plane, the direction of movement of the area is changed according to an aspect ratio of the image plane.

Further, in accordance with the still further embodiment of this invention, when an area for selecting a part of an image plane arranged to display an image thereon is displayed on the image plane and the area is made to move in a predetermined direction on the image plane, the direction of movement of the area is changed according to an aspect ratio of the image.

In accordance with the arrangement described above, it is possible to provide a display method for making a high quality display and also a method for making a natural display irrespective of the aspect ratio of the image plane or the aspect of the image.

The above and other objects and features of this invention will become apparent from the following detained description of embodiments thereof taken in connection with the accompanying drawings.

BRIEF DESCRIPTION OF THE DRAWINGS

FIGS. 5(a) to 5(c) show the movement of a selection frame as displayed on a monitor having an aspect ratio of 4:3 of a camera-integrated type VTR in each embodiment of this invention.

FIG. 7 shows the movement of a selection frame as displayed on a monitor having an aspect ratio of 16:9 of a camera-integrated type VTRs in each embodiment of this invention.

DETAILED DESCRIPTION OF THE PREFERRED EMBODIMENTS

The following describes, with reference to the drawings, first to fourth embodiments of this invention.

First Embodiment

Figure 1:
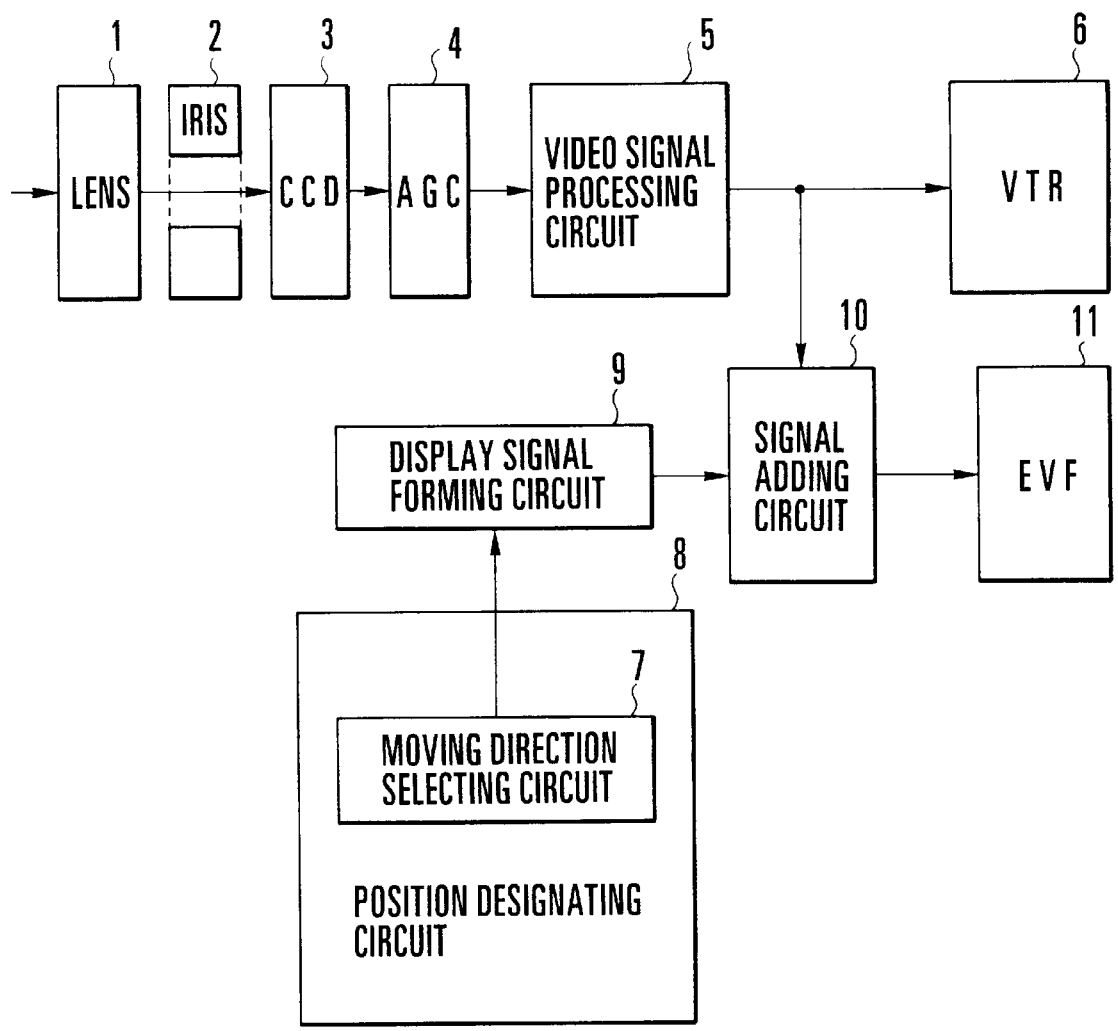
FIG. 1 is a block diagram showing the arrangement of the conventional camera-integrated type VTR.
Figure 4:
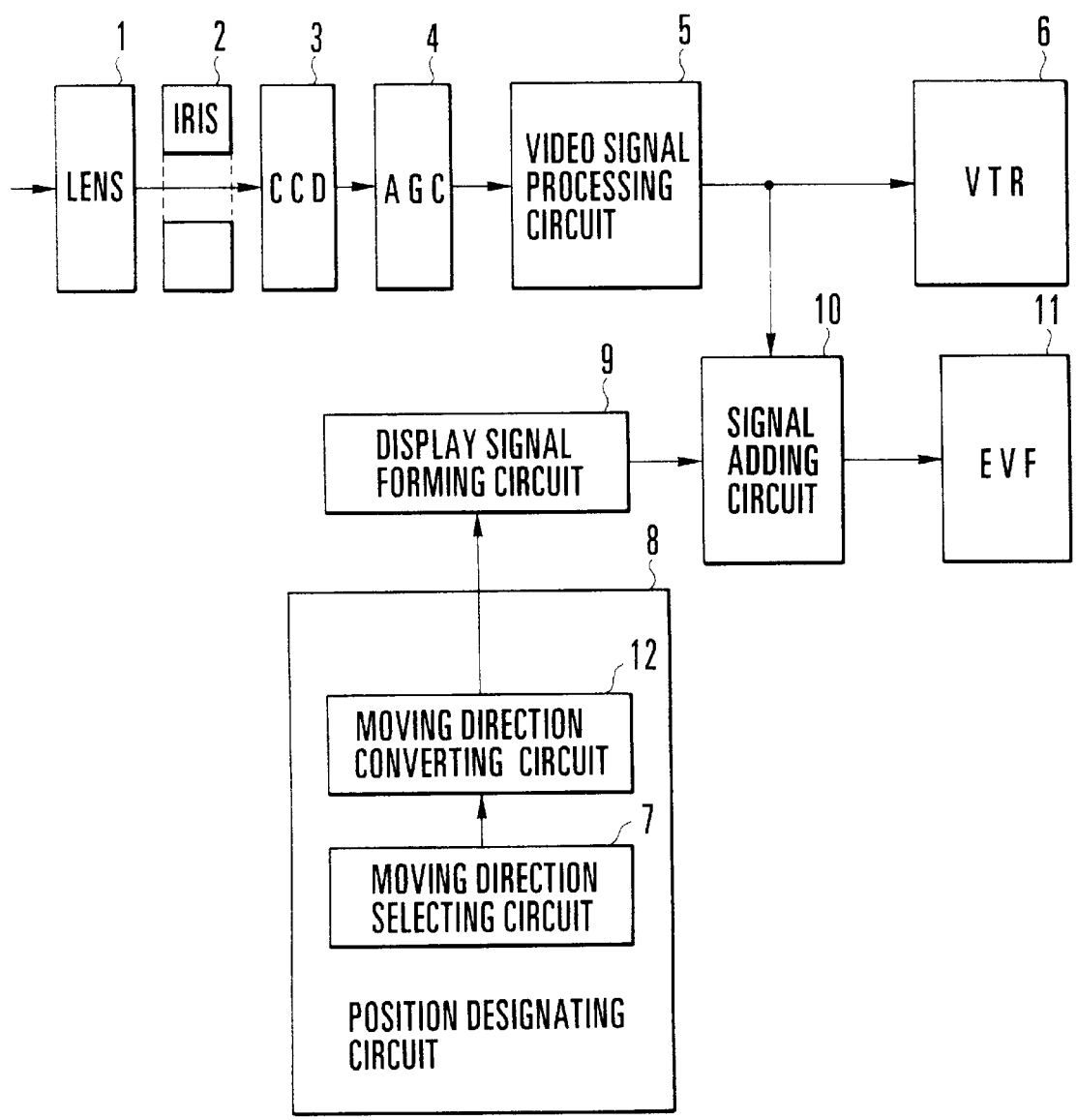
FIG. 4 is a block diagram showing the arrangement of a camera-integrated type VTR which is arranged as a first embodiment of this invention.

FIG. 4 is a block diagram showing the arrangement of a camera-integrated type VTR arranged according to this invention as a first embodiment thereof. In FIG. 4, all component elements indicated by the same reference numerals as those of the conventional camera-integrated type VTR described in the foregoing with reference to FIG. 1 have the same functions as those of the conventional VTR and, therefore, the details of them are omitted from the following description. Referring to FIG. 4, a moving direction converting circuit 12 is arranged to convert the direction of movement selected by the moving direction selecting circuit 7 into an apposite direction. Incidentally, the moving direction selecting circuit 7 is arranged to act in response to an input from a joy stick, a track ball, a mouse, a touch panel or the like.

The first embodiment operates as follows.

Referring to FIG. 4, one of the directions of movement of the selection frame 111 is selected by the moving direction selecting circuit 7. Then, the selected direction of movement is converted by the moving direction converting circuit 12 into an apposite direction. In accordance with the apposite direction, a display position of the selection frame 111 is determined by the position designating circuit 8 and the selection frame 111 is moved accordingly. The display signal forming circuit 9 forms a selection frame display signal for displaying the selection frame 111 in the display position determined by the position designating circuit 8, and supplies the selection frame display signal to the signal adding circuit 10. At the signal adding circuit 10, the selection frame display signal from the display signal forming circuit 9 is added to a video signal outputted from the video signal processing circuit 5 to obtain a sum signal. The sum signal thus obtained is displayed on the image plane 110 of the EVF 11 to permit the operator to monitor the selection frame 111 along with a video image.

In a case where the selection frame 111 is to be moved from the left lower end to the right upper end of the image plane 110, a locus of movement of the selection frame 111 is explained with reference to FIGS. 5(a) to 5(c). The aspect ratio of the image plane 110 is 4:3 in this instance.

Referring to FIGS. 5(a) to 5(c), assume that, before the selection frame 111 begins to be moved, the selection frame 111 is placed in a position (1) on the image plane 110. Further assume that, under this condition, an "obliquely upward direction to the right" is selected as the direction of movement of the selection frame 111 by the moving direction selecting circuit 7. The direction of movement as selected is then converted into a "36.87° obliquely upward direction to the right" by the moving direction converting circuit 12. As a result, the selection frame 111 takes a locus of movement which is moving in the "36.87° obliquely upward direction to the right" from the position (1) to a position (2), as shown in FIG. 5(b). After that, as shown in FIG. 5(c), the selection frame 111 moves from the position (2) to a position (3), where the upper side of the selection frame 111 impinges on the upper side of the image plane 110 and, at the same time, the right side of the selection frame 111 impinges on the right side of the image plane 110, so that the selection frame 111 is brought to a stop.

As described above, when the "obliquely upward direction to the right" is selected as the direction of movement by the moving direction selecting circuit 7, the moving direction converting circuit 12 acts to convert the selected direction of movement into the "36.87° obliquely upward direction to the right". By virtue of this action, the selection frame 111 can be smoothly moved to a desired position which is located at the right upper end of the image plane 110, as shown in FIGS. 5(a) to 5(c).

Second Embodiment

Figure 6:
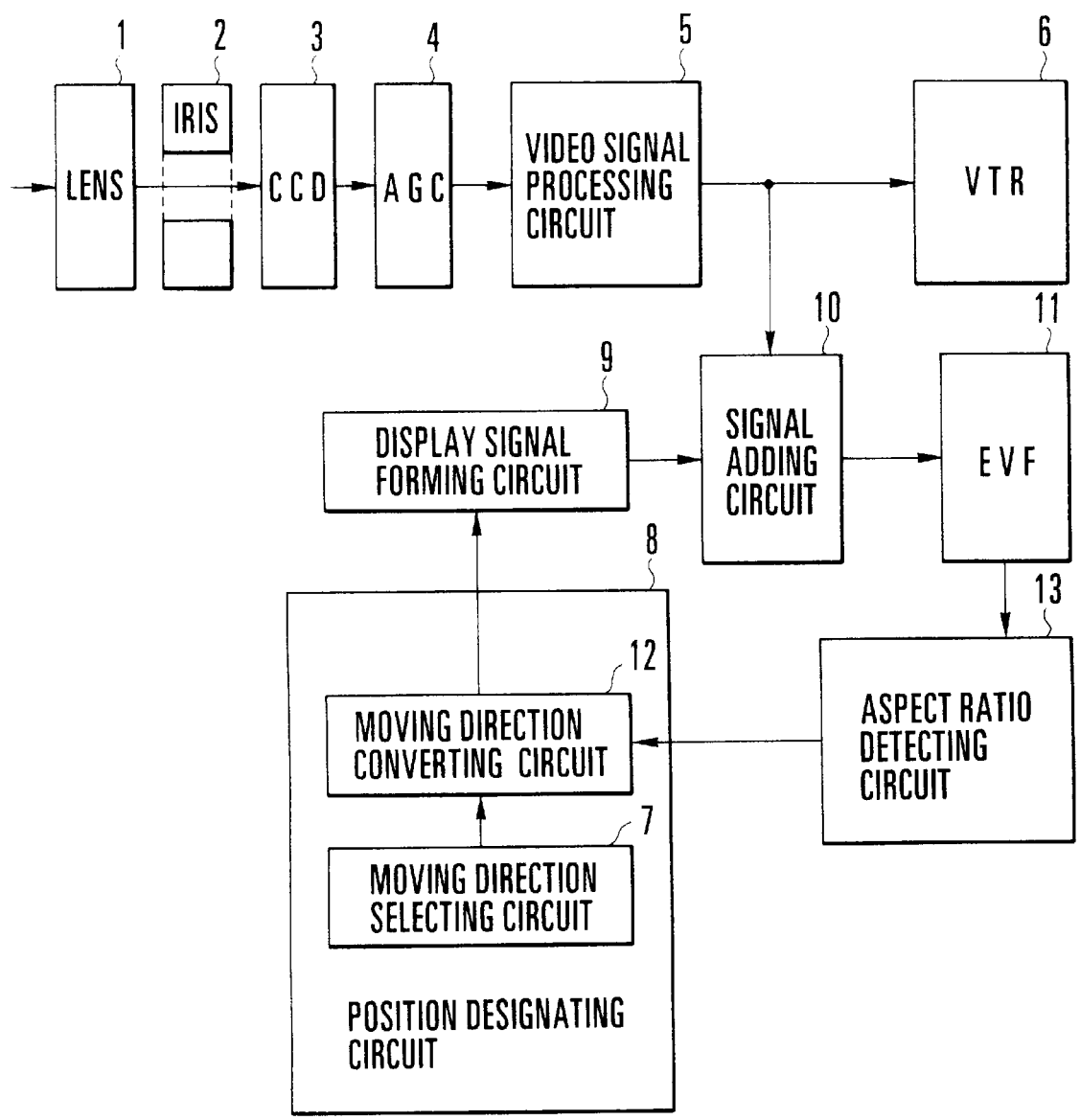
FIG. 6 is a block diagram showing the arrangement of a camera-integrated type VTR which is arranged as a second embodiment of this invention.

FIG. 6 shows in a block diagram the arrangement of a camera-integrated type VTR arranged according to this invention as a second embodiment thereof. In FIG. 6, all component elements indicated by the same reference numerals as those of the conventional camera-integrated type VTR described in the foregoing with reference to FIG. 1 have the same functions as those of the conventional VTR and, therefore, the details of them are omitted from the following description. Referring to FIG. 6, an aspect ratio detecting circuit 13 is arranged to automatically detect an aspect ratio of the image plane 110 of the EVF 11. A moving direction converting circuit 12 is arranged to convert the direction of movement of the selection frame 111 into an apposite direction according to the aspect ratio detected by the aspect ratio detecting circuit 13.

The second embodiment operates as follows.

Referring to FIG. 6, one of the directions of movement of the selection frame 111 is selected by the moving direction selecting circuit 7. The direction of movement as selected is converted by the moving direction converting circuit 12 into an apposite direction according to the aspect ratio of the image plane 110 detected by the aspect ratio detecting circuit 13. In accordance with the apposite direction, a display position of the selection frame 111 is designated by the position designating circuit 8 and the selection frame 111 is moved accordingly. The display signal forming circuit 9 forms a selection frame display signal for displaying the selection frame 111 in the display position designated by the position designating circuit 8, and supplies the selection frame display signal to the signal adding circuit 10. At the signal adding circuit 10, the selection frame display signal from the display signal forming circuit 9 is added to a video signal outputted from the video signal processing circuit 5 to obtain a sum signal. The sum signal is then displayed at the EVF 11 to permit the operator to monitor the selection frame 111 along with a video image.

Actions to be performed in moving the selection frame 111 from the left lower end to the right upper end of the image plane 110 of the EVF 11 are next described.

The aspect ratio of the image plane 110 of the EVF 11 is first automatically detected by the aspect ratio detecting circuit 13. At the moving direction converting circuit 12, the direction of movement selected by the moving direction selecting circuit 7 is converted in to an apposite direction according to the aspect ratio detected by the aspect ratio detecting circuit 13.

Referring to FIGS. 5(a) to 5(c), assume that, before the selection frame 111 begins to be moved, the selection frame 111 is placed in a position (1) on the image plane 110. Further assume that, under this condition, an "obliquely upward direction to the right" is selected as the direction of movement of the selection frame 111 by the moving direction selecting circuit 7. The direction of movement as selected is then converted into a "36.87° obliquely upward direction to the right" by the moving direction converting circuit 12. As a result, the selection frame 111 takes a locus of movement which is moving in the "36.87° obliquely upward direction to the right" from the position (1) to a position (2), as shown in FIG. 5(b). After that, as shown in FIG. 5(c), the selection frame 111 moves from the position (2) to a position (3), where the upper side of the selection frame 111 impinges on the upper side of the image plane 110 and, at the same time, the right side of the selection frame 111 impinges on the right side of the image plane 110, so that the selection frame 111 is brought to a stop.

As described above, the aspect ratio of the image plane 110 of the EVF 11 is automatically detected by the aspect ratio detecting circuit 13, and the direction of movement is converted in to an apposite direction by the moving direction converting circuit 12 according to the aspect ratio detected, so that the selection frame 111 can be moved to a desired position.

Further, as shown in FIG. 7, in a case where the aspect ratio of the image plane 110 of the EVF 11 is 16:9, in accordance with the aspect ratio which is automatically detected by the aspect ratio detecting circuit 13, the "obliquely upward direction to the right" selected as the direction of movement of the selection frame 111 by the moving direction selecting circuit 7 is converted into a "29.38° obliquely upward direction to the right" by the moving direction converting circuit 12, so that the selection frame 111 can be moved to a desired position.

Third Embodiment

Figure 8:
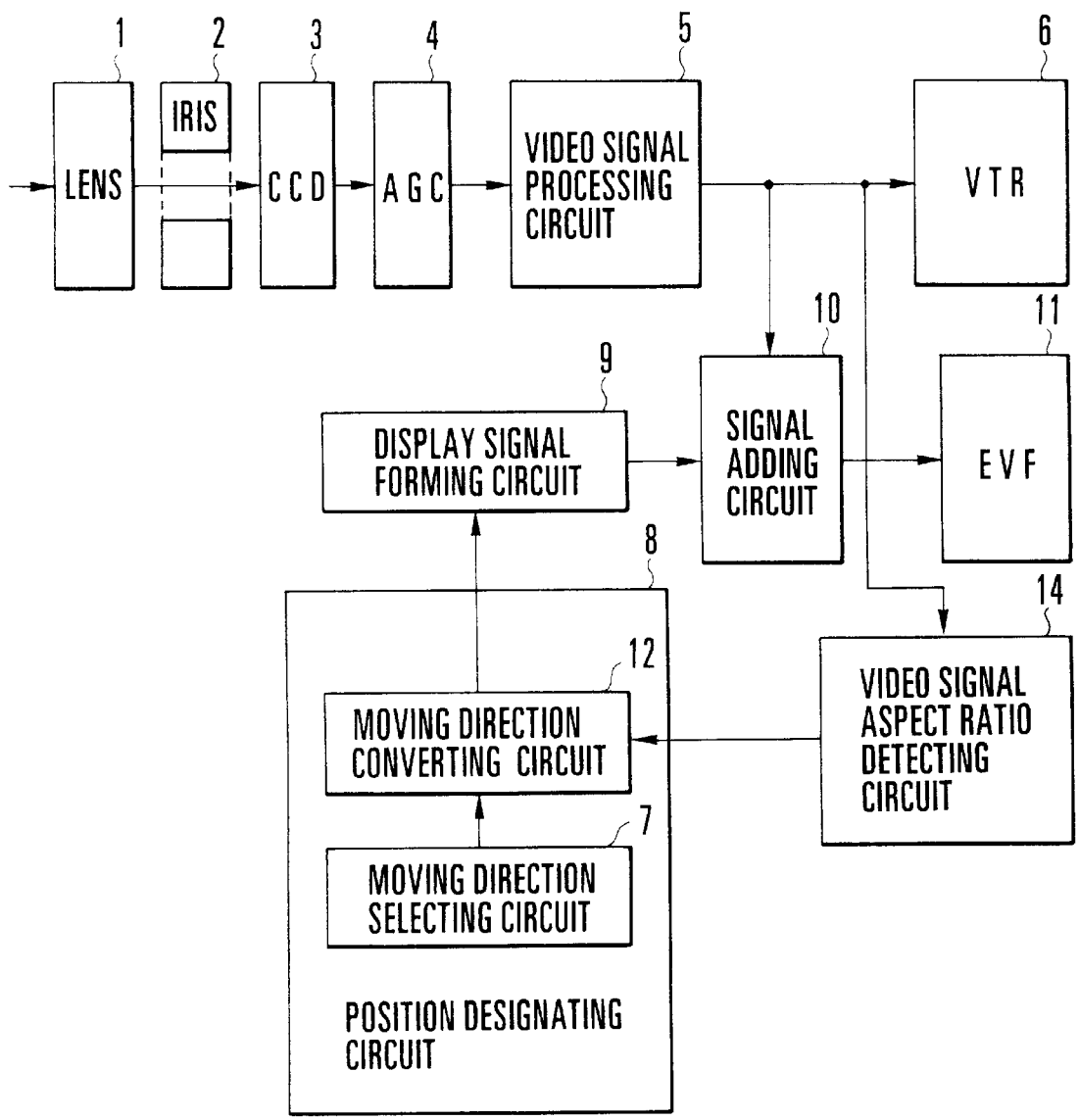
FIG. 8 is a block diagram showing the arrangement of a camera-integrated type VTR which is arranged as a third embodiment of this invention.

FIG. 8 is a block diagram showing the arrangement of a camera-integrated type VTR which is arranged as a third embodiment of this invention. In FIG. 8, all component elements indicated by the same reference numerals as in FIG. 1 have the same functions as those of the conventional VTR described in the foregoing. Therefore, the details of them are omitted from the following description.

Referring to FIG. 8, a video signal aspect ratio detecting circuit 14 is arranged to automatically detect the substantial aspect ratio of a video signal outputted from the video signal processing circuit 5. A moving direction converting circuit 12 is arranged to convert the direction of movement in to an apposite direction according to the substantial aspect ratio detected by the video signal aspect ratio detecting circuit 14. The video signal aspect ratio detecting circuit 14 is, for example, arranged to detect the aspect ratio by counting the horizontal scanning period and the vertical scanning period of the video signal and by obtaining a ratio between the horizontal and vertical scanning periods.

The third embodiment operates as follows.

Referring to FIG. 8, one of the directions of movement of the selection frame 111 is selected by the moving direction selecting circuit 7. The direction of movement as selected is converted by the moving direction converting circuit 12 into an apposite direction according to the substantial aspect ratio of the video signal detected by the video signal aspect ratio detecting circuit 14. In accordance with the apposite direction, a display position of the selection frame 111 is designated by the position designating circuit 8 and the selection frame 111 is moved accordingly. The display signal forming circuit 9 forms a selection frame display signal for displaying the selection frame 111 in the display position designated by the position designating circuit 8, and supplies the selection frame display signal to the signal adding circuit 10. At the signal adding circuit 10, the selection frame display signal from the display signal forming circuit 9 is added to the video signal outputted from the video signal processing circuit 5 to obtain a sum signal. The sum signal is then displayed at the EVF 11 to permit the operator to monitor the selection frame 111 along with a video image.

In a case where the selection frame 111 is to be moved on the image plane 110 having an aspect ratio of 4:3 from the left lower end to the right upper end of the image plane 110, the third embodiment operates as follows.

When the moving direction selecting circuit 7 selects, for example, an "obliquely upward direction to the right" for the selection frame 111 located in the position (1) as shown in FIG. 5(a), such a direction of movement is converted into a "36.87° obliquely upward direction to the right" by the moving direction converting circuit 12. As a result, the selection frame 111 is moved in the "36.87° obliquely upward direction to the right" from the position (1) to the position (2), as shown in FIG. 5(b). After that, the selection frame 111 moves from the position (2) to the position (3), where the upper side of the selection frame 111 impinges on the upper side of the image plane 110 and the right side of the selection frame 111 on the right side of the image plane 110, so that the selection frame 111 is brought to a stop.

As described above, the substantial aspect ratio of the video signal is automatically detected by the video signal aspect ratio detecting circuit 14, and the direction of movement of the selection frame 111 is converted by the moving direction converting circuit 12 in to an apposite direction according to the substantial aspect ratio detected, so that the selection frame 111 can be moved to a desired position.

Fourth Embodiment

Figure 9:
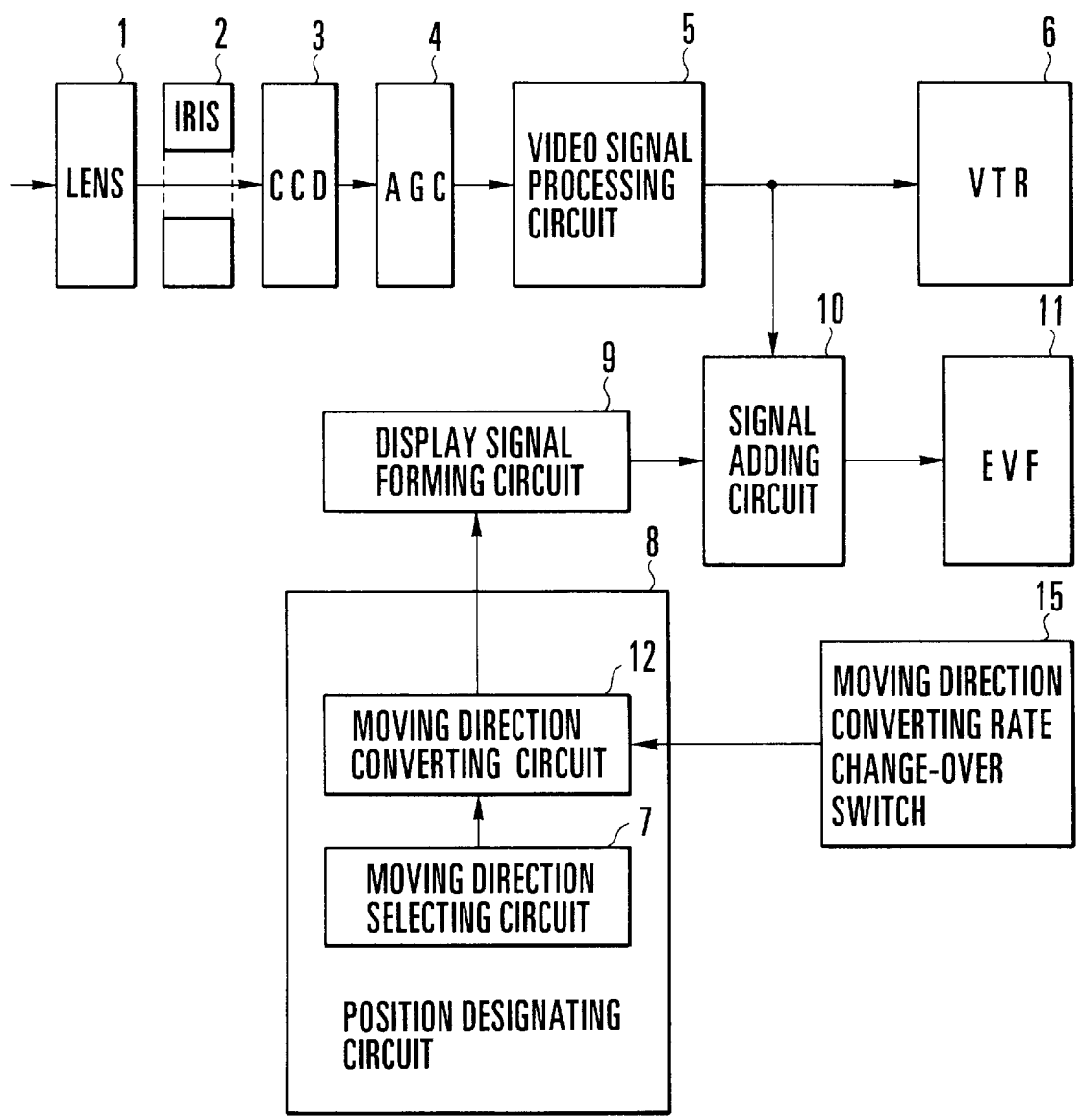
FIG. 9 is a block diagram showing the arrangement of a camera-integrated type VTR which is arranged as a fourth embodiment of this invention.

FIG. 9 is a block diagram showing the arrangement of a camera-integrated type VTR which is arranged according to this invention as a fourth embodiment thereof. In FIG. 9, component elements indicated by the same reference numerals as in FIG. 1 have the same functions as those of the conventional VTR described in the foregoing. The details of these elements are, therefore, omitted from the following description. Referring to FIG. 9, a moving direction converting rate change-over switch 15 is provided for changing over a converting rate at which the moving direction converting circuit 12 converts the direction of movement of the selection frame 111.

The fourth embodiment operates as follows.

Referring to FIG. 9, one of the directions of movement of the selection frame 111 is selected by the moving direction selecting circuit 7. Then, the direction of movement as selected is converted by the moving direction converting circuit 12 into an apposite direction according to a converting rate determined by the moving direction converting rate change-over switch 15. In accordance with the apposite direction, a display position of the selection frame 111 is designated by the position designating circuit 8. The display signal forming circuit 9 forms a selection frame display signal for displaying the selection frame 111 in the display position designated. The signal adding circuit 10 then adds the selection frame display signal to a video signal outputted from the video signal processing circuit 5 for providing a display at the EVF 11.

In a case where the selection frame 111 is to be moved from the left lower end to the right upper end of the image plane 110 having an aspect ratio of 4:3, the converting rate is first set by means of the moving direction converting rate change-over switch 15. Then, the direction of movement of the selection frame 111 is converted by the moving direction converting circuit 12 into an apposite direction according to the converting rate set by the moving direction converting rate change-over switch 15. If an "obliquely upward direction to the right" is selected by the moving direction selecting circuit 7 to move the selection fame 111 from the position (1) shown in FIG. 5(a), such a direction of movement is converted by the moving direction converting circuit 12 into a "36.87° obliquely upward direction to the right", and the selection frame 111 is moved from the position (1) to the position (2) as shown in FIG. 5(b) and, then, from the position (2) to the position (3) as shown in FIG. 5(c). At the position (3), the upper and right sides of the selection frame 111 impinge on the upper and right sides of the image plane 110, respectively, so that the selection frame 111 is brought to a stop.

As described above, the fourth embodiment allows the selection frame 111 to be moved to a desired position by setting a converting rate by the moving direction converting rate change-over switch 15 and then by converting the direction of movement by the moving direction converting circuit 12 according to the converting rate set by the moving direction converting rate change-over switch 15.

In each of the first to fourth embodiments described above, this invention is applied to a display device adapted for a so-called camcorder. However, this invention is of course not limited to it but also applies to a display device adapted, for example, for a video game, a personal computer or the like.

Fifth Embodiment

The applications of this invention to a video game and a personal computer are briefly described by way of example below.

[In the case of a video game]

For example, in a case where a TV monitor such as a Braun tube or the like is used as a monitor, a joy stick is used as a moving direction selecting means, and an animation character is used as a position designating means, the direction in which the animation character is actually moved on the TV monitor with respect to the movement of the joy stick is converted by a moving direction converting means, so that the movement to a desired position can be effected.

[In the case of a personal computer]

For example, in a case where a TV monitor such as a Braun tube or the like is used as a monitor, a mouse is used as a moving direction selecting means, and a cursor of the personal computer is used as a position designating means, the direction in which the cursor is actually moved on the TV monitor with respect to the movement of the mouse is converted by a moving direction converting means, so that the movement to a desired position can be effected.

Figure 2:
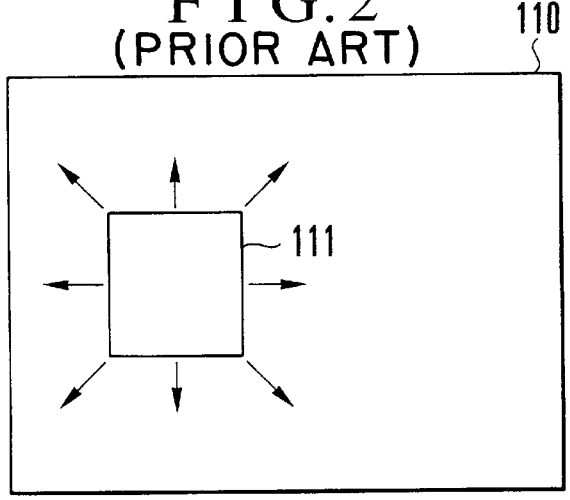
FIG. 2 shows a selection frame which is displayed on a monitor of the camera-integrated type VTR.
Figure 3A:
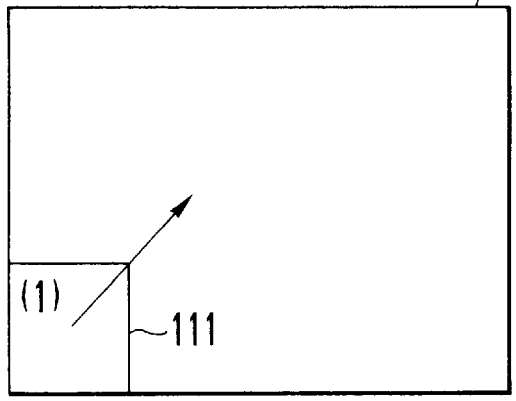
FIGS. 3(a) to 3(f) show the movement of the selection frame as displayed on the monitor of the conventional camera-integrated type VTR.
Figure 3B:
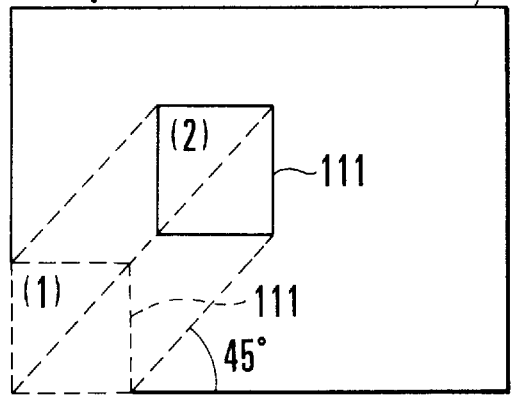
Figure 3C:
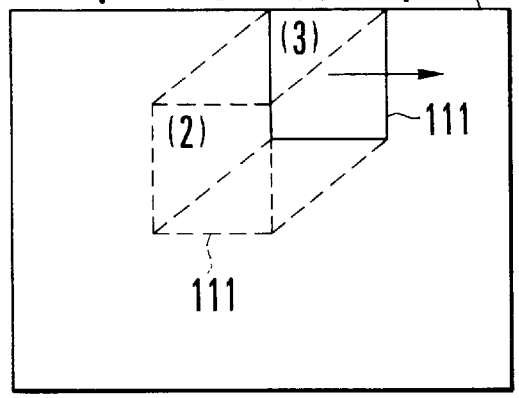
Figure 3D:
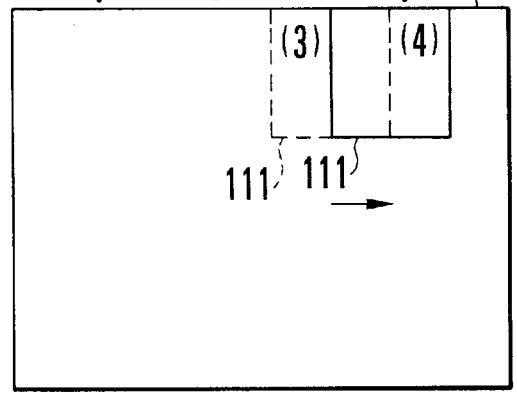
Figure 3E:
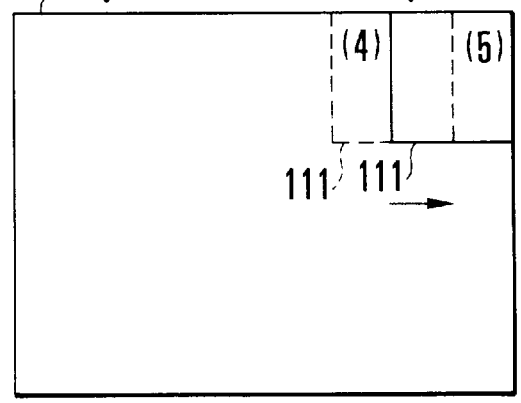
Figure 3F:
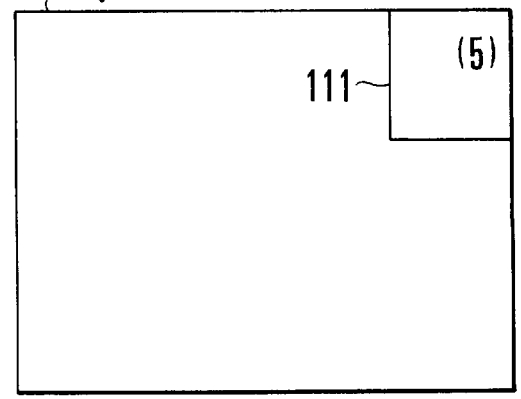

Incidentally, in a case where there are a total of eight directions of movement which are selectable by the moving direction selecting circuit 7 as shown in FIG. 2, each of the embodiments described may be arranged to convert only four oblique directions among the eight directions by using the moving direction converting circuit 12 and to leave the other vertical and horizontal directions unconverted.

What is claimed is:

1. A display device comprising:
   a) display means for displaying, on an image plane arranged to display an image, an index for selecting a part of the image plane;
   b) moving means for moving the index in any selected one of vertical, horizontal and oblique directions on the image plane; and
   c) control means for providing a control to change an angle at which the index is moved according to an aspect ratio of the image plane of said display means in a case where the movement in the oblique direction is selected by the moving means.

2. A device according to claim 1, wherein said display device is a viewfinder of a camera.

3. A device according to claim 1, wherein said display device is a monitor of a personal computer.

4. A display device comprising:
   a) display means for displaying, on an image plane arranged to display an image, an index for selecting a part of the image plane;
   b) moving means for moving the index in any selected one of vertical, horizontal and oblique directions on the image plane;
   c) moving direction selecting means for selecting the moving direction of the index; and
   d) control means for providing a control to change an angle at which the index is moved according to an aspect ratio of the image in a case where the movement in the oblique direction is selected by the moving direction selecting means.

5. A device according to claim 4, wherein said display device is a viewfinder of a camera.

6. A device according to claim 4, wherein said display device is a monitor of a personal computer.

7. A display device comprising:
   a) display means for displaying, on an image plane arranged to display an image, an area for selecting a part of the image plane;
   b) moving means for moving the area in any selected one of vertical, horizontal and oblique directions on the image plane;
   c) moving direction selecting means for selecting the moving direction of the area; and
   d) control means for providing a control to change an angle at which the area is moved according to an aspect ratio of the image plane of said display means in a case where the movement in the oblique direction is selected by the moving direction selecting means.

8. A device according to claim 7, wherein said display device is a viewfinder of a camera, and wherein the area is used for distance measurement.

9. A device according to claim 7, wherein said display device is a viewfinder of a camera, and wherein the area is used for light measurement.

10. A device according to claim 7, wherein said display device is a monitor of a personal computer.

11. A display device comprising:
    a) display means for displaying, on an image plane arranged to display an image, an area for selecting a part of the image plane;
    b) moving means for moving the area in any selected one of vertical, horizontal and oblique directions on the image plane;
    c) moving direction selecting means for selecting the moving direction of the area; and
    d) control means for providing a control to change an angle at which the area is moved according to an aspect ratio of the image in a case where the movement in the oblique direction is selected by the moving direction selecting means.

12. A device according to claim 11, wherein said display device is a viewfinder of a camera, and wherein the area is used for distance measurement.

13. A device according to claim 11, wherein said display device is a viewfinder of a camera, and wherein the area is used for light measurement.

14. A device according to claim 11, wherein said display device is a monitor of a personal computer.

15. A display method comprising the steps of:

displaying, on an image plane arranged to display an image, an index for selecting a part of the image plane; and providing for moving the index in any one of vertical, horizontal and oblique directions on the image plane, and when moving the index in the oblique direction, providing a control to change an angle at which the index is moved according to an aspect ratio of the image plane.

16. A display method comprising the steps of:

displaying, on an image plane arranged to display an image, an index for selecting a part of the image plane; and providing for moving the index in any one of vertical, horizontal and oblique directions on the image plane, and when moving the index in the oblique direction, providing a control to change an angle at which the index is moved according to an aspect ratio of the image.

17. A display method comprising the steps of:

displaying, on an image plane arranged to display an image, an area for selecting a part of the image plane; and providing for moving the index in any one of vertical, horizontal and oblique directions on the image plane, and when moving the index in the oblique direction, providing a control to change an angle at which the index is moved according to an aspect ratio of the image plane.

18. A display method comprising the steps of:

displaying, on an image plane arranged to display an image, an area for selecting a part of the image plane; and providing for moving the area in any one of vertical, horizontal and oblique directions on the image plane, and when moving the area in the oblique direction, providing a control to change an angle at which the area is moved according to an aspect ratio of the image.

* * * * *